March 3, 1953 E. A. JOHNSON 2,630,481

DATA TRANSMISSION SYSTEM

Filed July 15, 1949 4 Sheets-Sheet 1

E. A. Johnson
Inventor

By Moore and Hall
Attorneys

Inventor:
E. A. JOHNSON.

Moore and Hall
By Attorneys.

March 3, 1953 E. A. JOHNSON 2,630,481

DATA TRANSMISSION SYSTEM

Filed July 15, 1949 4 Sheets-Sheet 3

E. A. Johnson
Inventor

By Moore and Hall
Attorneys

March 3, 1953 E. A. JOHNSON 2,630,481

DATA TRANSMISSION SYSTEM

Filed July 15, 1949 4 Sheets-Sheet 4

11

E. A. Johnson
Inventor

By Moore and Hall
Attorneys

Patented Mar. 3, 1953 2,630,481

UNITED STATES PATENT OFFICE 2,630,481

DATA TRANSMISSION SYSTEM

Eric A. Johnson, Malvern, England, assignor to Minister of Supply in His Majesty's Government of the United Kingdom of Great Britain and Northern Ireland, London, England Application July 15, 1949, Serial No. 104,859
In Great Britain July 21, 1948

22 Claims. (Cl. 177—351)

The present invention relates to systems and apparatus for conveying data or information, in which the data to be transmitted to the remote position is capable of being represented as a shaft position, for example, the position of a pointer or the velocity of an output shaft performing or controlling some operation. The present invention is concerned with remote-position-control systems in which the positional data is represented by a multiple-unit code such as a number in the binary scale.

A system and apparatus for transmitting shaft rotation by reference to a binary code is described in the specifications of copending patent applications Serial Nos. 89,534 and 89,535. These specifications disclose the encoding and decoding apparatus of a system in which the fractional rotation of a shaft is represented by a binary number, the number of digits employed being so selected that both complete rotation and also the smallest desired fraction of rotation may be defined by appropriate digits. The transmitting and receiving devices employed for the interconversion of rotational position and binary numbers may be employed in known manner to give coarse and fine data. The specifications referred to describe such arrangements in which coarse and fine units, suitably interconnected by gearing, handle positional data as a coherent binary number in which the binary numbers representing the coarse and fine rotations are effectively added.

Such systems of data transmission by the use of coarse and fine elements coupled by gearing suffer from the disadvantage that the accuracy of the "fine" data may be limited by the accuracy of the gearing.

It is one object of the present invention therefore to provide a system and apparatus for the transmission of rotational position data by means of a binary or similar code in which the fine code elements corresponding to the fine subdivisions of the positional data are derived from apparatus which may be directly coupled, without the interposition of gearing, with the apparatus producing the code elements corresponding to the coarse subdivisions of the positional data.

It is a further object of the invention to provide such a system in which fine subdivisions of angular movement are transmitted by tapping off from a potentiometer a voltage representative of the angular position to be transmitted and converting this voltage into a code combination of digit signals.

A further object is to provide such a system in which the voltage applied to the potentiometer is in the form of a repetitive pattern of potential levels which may be stepped around the potentiometer in accordance with relatively coarse subdivisions of the rotational position to be transmitted.

A still further object of the invention is to provide a system for transmission of rotational position data in which coarse subdivisions of said data are transmitted as multiple-unit code signals, the fine subdivisions of said data are derived from a potentiometer to which is applied a repetitive pattern of potential stepped around said potentiometer in accordance with said coarse subdivisions the voltage tapped off from the potentiometer being converted to elements of a multiple-unit code, means being provided for combining the multiple-unit code signals of the coarse and fine subdivisions into a coherent code combination of signals.

Further objects of the invention will emerge as the description proceeds.

The present invention therefore envisages a system for the transmission of data represented by the angular position of an input shaft comprising, at a transmitting point, first means coupled to the input shaft for producing signals in the form of a multiple-unit code representative of the angular position of the input shaft, in coarse fractional divisions of a revolution and second means comprising a linear potentiometer directly coupled to the input shaft and provided with a plurality of tappings which are so energised in dependence upon the coarse divisions recorded by said first means that there is produced around the potentiometer a repetitive pattern of potential distribution which progresses around the potentiometer winding in step with the coarse fractional changes in angular position of the input shaft, whereby the voltage at the wiper arm of the potentiometer provides a measure of fine subdivision of the coarse fractional divisions of angular position determined by said first means. The voltage derived from the potentiometer wiper may be suitably represented in both amplitude and sign by a further multiple-unit code signal representative of the input-shaft angular position to a fine degree of accuracy.

According to a further feature of the invention there may be provided at a receiving point apparatus, which in response to the multiple-unit code elements representative of the coarse angular position information causes an output shaft to be set automatically to an appropriate angular position, and also causes to be set up on a multiple-tap potentiometer, directly coupled to the output shaft, a repetitive pattern of potential distribution which progresses around the potentiometer winding in step with the coarse fractional changes in the received angular position data, and further apparatus which compares the voltage derived from the potentiometer brush and a voltage representative of the fine subdivisions of received angular position data, to produce an error voltage which causes the output shaft to be set automatically in accordance with the received fine angular position data.

The systems and apparatus described in my co-pending applications Serial Nos. 89,534 and 89,535 and which may conveniently provide the coarse elements of the system of the present invention comprises, essentially, at the transmitting end a commutator device. The commutator contacts and brushes are associated with a resistance network so arranged that on a number of output connections there are obtained voltages representing, in code, uniquely the relative position of the commutator contacts and brushes. Each output connection may define the condition of its code element by the existence of a high or low voltage on the connection and the number of output connections is such that the binary code or number represented on the connections indicates the fractional angular position of the commutator shaft and the smallest digit of the binary number represents the smallest fractional movement of the shaft which is to be observed. Thus if the commutator is such that rotation is observable to the nearest $\frac{1}{64}$ of a revolution then six output connections providing a six digit binary number or code are required. For the purpose of transmission the voltages or currents representative of the code elements or digits may be fed to separate channels or a time division multiplex method may be employed. At the receiving end of the system the received code elements or binary number digits are caused to set up a voltage distribution on a commutator arrangement and the voltages picked up by the commutator brushes are employed to control a servo system which rotates the commutator so that the brushes occupy a null position on the voltage distribution. The angular positions of the commutator shafts at the transmitting and receiving ends of the system then correspond.

Specifications Serial Nos. 89,534 and 89,535 describe these equipments in detail. In systems embodying the present invention the coarse elements of the positional data may be handled by apparatus such as that described in the patent specifications referred to. The present invention however is not limited to use in conjunction with the particular apparatus described in the prior specifications but may be used in conjunction with any coarse angular-position data transmission system which is adapted to transmit the data in the form of a suitable code or binary number.

In order that the invention may be more clearly understood, reference will now be made to the accompanying drawings in which.

Figure 2:
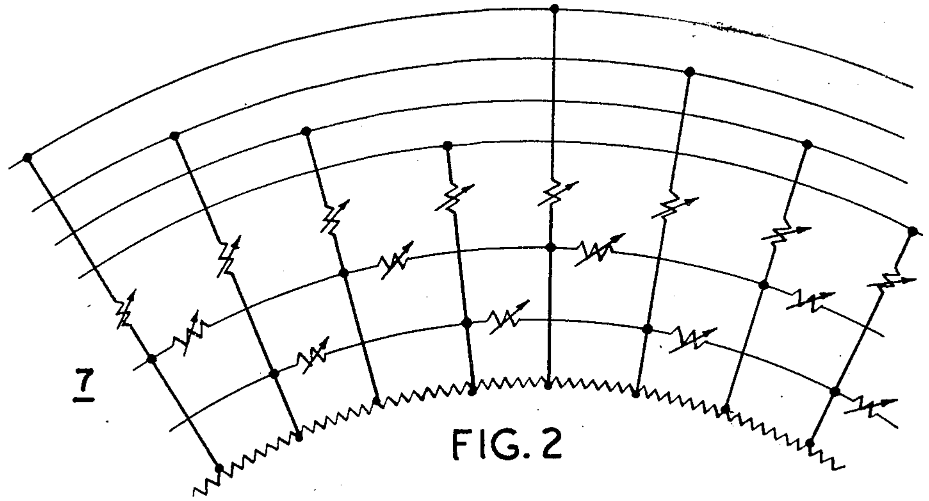
Fig. 2 illustrates a part of the arrangement of Fig. 1 embodying a refinement.

An input shaft 1 drives a commutator system 2 which is arranged to provide 9 digits of binary data, i. e. defines the input shaft position to 1 part in 512. The system 2 may comprise as shown a fine commutator 3 and coarse commutator 4 interconnected by gearing 5 and associated with the appropriate circuits, designated by the retangle 6. The system 2 may, as previously stated, operate in the manner described in specification Serial No. 89,534. Mounted directly on shaft 1 is the contact brush 9 of a linear potentiometer 7 with 512 accurately equally-spaced tapping points. As above stated, the 9-digit number set up by the system 2 represents the position of brush 9 upon the potentiometer to the nearest 512th part of a revolution. This number therefore indicates between which two taps of the potentiometer the brush lies. The remainder of the apparatus, yet to be described is required to define the position of the brush 9 between taps to a higher order of accuracy and in fact provides a further 6 digits of information to form a coherent 15 digit binary number representing the shaft position. The tapping points on the potentiometer 7 are therefore connected together, every fourth tapping point being connected to provide four common feed lines to the potentiometer winding. The four feed lines are energised from a suitable D. C. source through a switch unit 8 so that each group of four tapping points is energised with the voltage pattern, positive-open circuit-negative-open circuit, the pattern being continuously repeated around the potentiometer winding. The term "open circuit" is used here to indicate that the tapping point is disconnected from the source of voltage so that the portion of the potentiometer between tapping points connected to the negative and positive poles of the voltage source constitutes a linear potentiometer from which may be picked off any voltage from that of the negative to that of the positive pole of the supply. The potentiometer is thus, effectively, subdivided into 256 linear sub-potentiometers with any one of which the brush 9 may be cooperating; which one is adequately defined by the first 8 digits of the 9-digit number above referred to, and which half of the sub-potentiometer by the 9th digit. In order that the final 15-digit number may be coherent, the 9th digit of the 9-digit member is made to overlap the first digit of a 7-digit number produced in the apparatus yet to be described. It is therefore arranged that the brush 9 shall always lie between positive-clockwise and negative-anticlockwise tapping points. This means that the energizations of the tapping points must be interchanged as the brush 9 passes through a tapping point, that is every 512th of a revolution. This means that the voltage pattern must be stepped round by one step each time the 9th digit of the 9-digit number changes. Since, however, each section of the voltage pattern occupies $\frac{1}{256}$ of the potentiometer, it is necessary to take account also of the 8th digit of the 9-digit number in order to preserve the correct sequence, positive-open circuit-negative-open circuit, for each group of four tapping points. The switch unit 8 (hereinafter described in detail with reference to Fig. 6) is therefore controlled by the two finest digits of the 9-digit number developed by the commutator system 2 so that the voltage pattern on the potentiometer is moved by one tap spacing for every change in the finest digit of the 9-digit number.

The potentiometer brush 9 is so aligned upon the shaft 1 that it always lies between positive-clockwise and negative-anticlockwise peaks of the voltage distribution and is thus effectively always co-operating with a linear potentiometer whose total range corresponds to $\frac{1}{256}$ of a revolution of shaft 1. The voltage picked up by the brush 9 is converted in unit 10, hereinafter described, to a seven digit binary number which is proportional in magnitude and sign to the voltage, the scale of the conversion being such that the total voltage swing in the voltage pattern, is defined by the two largest digits in the number. The largest digit is thus produced by a movement of the brush from the zero voltage position by an amount greater than one half of the tap spacing and will thus only be produced when the potentiometer brush moves outside a sector occupying $\frac{1}{512}$ of the complete winding centered about an open circuit tap.

The seven digit number and the 9 digit number from the coarse device 2 are combined in adding unit 11, hereinafter described, to produce a 15 digit number, the largest digit of the number developed by the potentiometer and unit 10 overlapping the finest digit (corresponding to $\frac{1}{512}$ revolution) produced by unit 2. The added seven digit number thus provides an additional 6 digits of fine information over and above that supplied by unit 2 and at the same time corrects any error in the fine digit which may be present in the information from the unit 2 owing to imperfections in gearing or similar causes. The device 2 is so arranged that, if perfect, its digits would change over and cause the switch unit 8 to move the voltage distribution by one tap spacing just as the potentiometer brush passes the mid point between taps and would approach nearer to an energised tap than an open circuit tap. If however, owing to imperfections in device 2 the production of a change in the finest digit of the 9 digit number, and thus the movement of the potential pattern, is late or early, then the potentiometer arm will have crossed the midpoint and the largest digit of the 7 digit number will have changed and thus a digit will be added to or subtracted from the number developed by the device 2 and will correct that number.

The final accuracy of the angular information developed in terms of the 15 digit binary number will thus depend upon the accuracy of setting of the tapping points upon the potentiometer and upon the accuracy of conversion from voltage to binary number in device 10. The linearity of the potentiometer windings between tapping points is of secondary importance as non-linearity will only produce a proportional error in the smaller digits of the 7 digit number. With the system disclosed if the tapping points are correctly set to within one minute of arc an overall accuracy of 1 min. of arc may be achieved as non-linearity of the potentiometer between taps and errors in voltage-to-binary number conversion are not likely to exceed 1%. In order to obtain the required accuracy of spacing of the tapping points on the potentiometer, known techniques employing adjustable padding and correcting resistances in association with the main potentiometer winding may be employed. A suitable arrangement of resistances is shown in Fig. 2.

Figure 4:
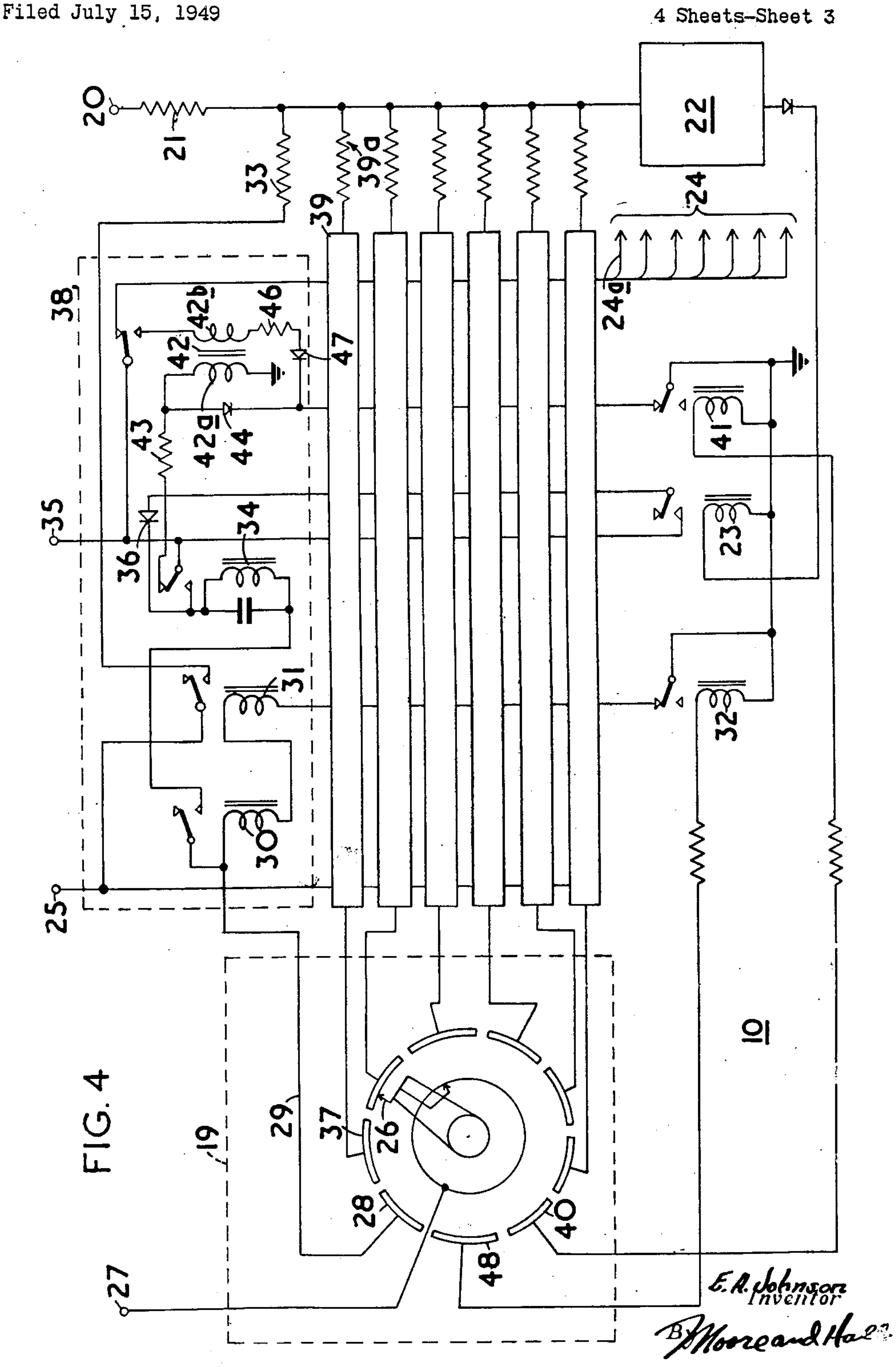
Fig. 4 illustrates one form of apparatus suitable for use in the arrangements of Fig. 1 for converting a voltage into the appropriate multiple-unit code signals.

The arrangement 10 used for converting the voltage picked-off from potentiometer 7 into a corresponding multi-unit code is illustrated in Fig. 4. In the arrangement shown the voltage picked off from potentiometer 7 by brush 9 is applied to an input terminal 20 which is connected through a resistor 21 to a D. C. amplifier 22, the output from which controls relay 23 the function of which will be described later. The voltage applied to amplifier 22 from terminal 20 is required to set up on the output lines 24 a combination of "mark" and "space" indications, in this case represented by no voltage and voltage conditions respectively and in this way a number in the binary scale characteristic of the input voltage is represented.

The principle adopted is to compare the voltage at terminal 20 with a stabilised reference voltage applied to the apparatus through terminal 25, the comparison being carried out in a number of steps diminishing in a scale of two. The system operates as follows: the stabilised reference voltage is equal in magnitude to the highest value which the input voltage can have but opposite in sign thereto. That is to say, assuming that the supply to potentiometer 7 is 100 volts positive to earth, the reference potential is 100 volts negative to earth. If, therefore, the reference voltage or any fraction of it, is combined with the voltage at terminal 20 (i. e. the voltage picked off from potentiometer 7 by brush 9) the effect will be to subtract the reference voltage (or part thereof) from the voltage at terminal 20. Half of this voltage is first subtracted from the input voltage and the remainder is applied to the D. C. amplifier 22 which determines whether the remainder is positive or negative, that is whether the voltage at terminal 20 is above or below the half way mark. If the remainder is positive, i. e. the input to the amplifier 22 is positive (which will arise if the voltage at terminal 20 is above the half-way mark) a "1" is marked in the position of greatest significance of the code number set up on the output lines, by application of the "mark" potential to the appropriate line. It is also arranged that the voltage subtraction at the input to amplifier 22 carried out for this stage of the process is retained for the remainder of the process.

If on the other hand the remainder voltage is negative, i. e. the input to amplifier 22 is negative, then a "0" or "space" voltage is applied to the appropriate output line and the subtraction of half the reference voltage is removed so that the input to the amplifier 22 is restored to the full value of the voltage on terminal 20. At the next stage of the conversion process, one quarter of the reference voltage is subtracted from the input voltage to the amplifier 22 left after the last described operation and the amplifier is again required to determine whether the remainder voltage now left is positive or negative. If it is positive, again a "1" is marked in the appropriate position in the code number by applying the "mark" potential to the appropriate output line and the subtraction is maintained. If, however, it is negative, a "0" is marked and the subtraction is removed.

The process is repeated subtracting successively 1/8, 1/16, 1/32, etc. of the reference voltage from the input voltage to the amplifier 22 remaining after each successive stage until, at the final stage, the input voltage to the amplifier 22 becomes substantially zero and there have been set up on the output lines the appropriate combination of "1's" and "0's" to characterise the voltage which is being converted.

The operation will be understood more readily by reference to the details given below which represent the successive stages passed through and the result of converting two typical input voltages. In these examples the maximum possible value of the voltage on terminal 20 is taken to be 100 volts so that as stated above the reference voltage will also be 100 volts.

The tables are as follows:

*Table I*

[Voltage at terminal 20=30 v.]

| Starting Voltage | Fraction Subtracted | Volts Subtracted | Remainder Voltage | Subtraction Retained or Removed | Digit |
|---|---|---|---|---|---|
| 30 | 1/2 | 50 | −20 | Removed | 0 |
| 30 | 1/4 | 25 | 5 | Retained | 1 |
| 5 | 1/8 | 12 1/2 | −7 1/2 | Removed | 0 |
| 5 | 1/16 | 6 1/4 | −1 1/4 | do | 0 |
| 5 | 1/32 | 3 1/8 | 1 7/8 | Retained | 1 |
| 1 7/8 | 1/64 | 1 9/16 | 5/16 | do | 1 |
| 5/16 | 1/128 | 25/32 | −15/32 | Removed | 0 |

*Table II*

[Voltage at terminal 20=60 v.]

| Starting Voltage | Fraction Subtracted | Volts Subtracted | Remainder Voltage | Subtraction Retained or Removed | Digit |
|---|---|---|---|---|---|
| 60 | 1/2 | 50 | 10 | Retained | 1 |
| 10 | 1/4 | 25 | −15 | Removed | 0 |
| 10 | 1/8 | 12 1/2 | −2 1/2 | do | 0 |
| 10 | 1/16 | 6 1/4 | 3 3/4 | Retained | 1 |
| 3 3/4 | 1/32 | 3 1/8 | 5/8 | do | 1 |
| 5/8 | 1/64 | 1 9/16 | −15/16 | Removed | 0 |
| 5/8 | 1/128 | 25/32 | −5/32 | do | 0 |

Referring now to Table I above, the input voltage on terminal 20 has been taken as 30 volts. The starting voltage is therefore 30 volts. Interpreting therefore the top horizontal line of the table, the conversion process first involves subtracting half of the reference voltage, that is to say 50 volts, leaving a remainder voltage of −20 volts. Since this result is negative the subtraction is removed and a "0" marked on the appropriate output line. The next stage of the process commences at 30 volts (since the subtraction of half is removed as above stated) and one quarter of the reference voltage is now subtracted, that is to say 25 volts. The remainder voltage is now +5 volts so that the subtraction is retained and a "1" marked on the appropriate output line. The starting voltage for the next stage is now 5 volts since the subtraction was retained. From these 5 volts, 1/8 of the reference voltage is subtracted, that is 12 1/2 volts is subtracted leaving −7 1/8 volts. The input to amplifier 22 is now negative so that the last subtraction is removed and a "0" marked in the third output line. As will be seen the process proceeds until the remainder voltage is only −15/32 volt and there have been built-up on the output lines indications corresponding to the binary number 0 1 0 0 1 1 0. This number characterises the voltage 30 at the input terminal 20.

In Table II above the process has been worked out assuming a voltage at terminal 20 of 60 volts. The various stages of the conversion process can be deduced from the table and it will be seen from the extreme right-hand column that the code number build-up on the output lines will be 1 0 0 1 1 0 0, characterising the voltage 60 v.

The apparatus shown performs this function in the following way. A commutator 19 having nine segments has an operating voltage applied to its brush contact 26 from terminal 27. With the brush contact 26 on the first segment 28 of the commutator this voltage is applied through lead 29 to a relay 30, termed the trial relay, connected in series with a further relay 31 termed the subtractor relay, and to earth through the back contact of a still further relay 32, the function of which will be later described. Relays 30 and 31 operate in this circuit and relay 31 connects the stabilised reference potential from terminal 25 to the D. C. amplifier 22 through a resistor 33 the value of which is suitably chosen to apply half the reference potential to the amplifier input in opposition to the input voltage from potentiometer 7. Trial relay 30 prepares a circuit for a further relay 34 termed the subtractor hold relay.

According to whether the voltage applied to amplifier 22 through resistor 33 is above or below the input voltage from terminal 20, the amplifier 22 does or does not provide an output which will operate the relay 23 above referred to. If the resultant input to amplifier 22 is positive this latter relay operates and closes the circuit from the power supply connected to terminal 35, through contact of relay 23, the rectifier 36, winding of relay 34 to operated contact relay 30. Relay 34 does not operate in this circuit, its winding being connected to the power supply positive voltage at both ends, until the brush contact 26 leaves segment 28. Relay 34 then operates and closes a holding circuit for itself from power supply at terminal 35 through its own contact, contact of relay 30, winding of relay 30, relay 31 and back contact of relay 32 to earth. Relays 30 and 31 are also held in this circuit.

As the brush contact 26 passes on to the next segment 37, the functions above described are carried out in a further circuit 39, similar to that enclosed in the dotted rectangle 38, which serves to connect the reference potential from terminal 25 to the input of D. C. amplifier 22 through a resistor 39$a$ chosen to effect a subtraction of one quarter the reference voltage from the input voltage. Again the output from the amplifier 22 operates, or not, the relay 23 deciding whether the subtractor hold relay in this further circuit will be operated or not. Similar circuits are thus set-up for the subtraction of 1/8, 1/16, 1/32, 1/64 and 1/128 of the reference potential as the brush contact 26 contacts successively the next five contacts of the commutator. Brush contact 26 now contacts segment 40 of the commutator and operates a relay 41 termed the storage reset relay. Operation of this relay sets a storage relay 42 (which has its counterpart in the remaining six circuits connected to the other trial contacts of the commutator) into its operated or non-operated condition to indicate "mark" or "space" on the appropriate output line in the following way. Relay 42 has two windings labelled 42$a$ and 42$b$. Winding 42$a$ is, in the unoperated condition of relay 34 connected in a circuit from the power supply on terminal 35 through back contact of relay 34, resistor 43, winding 42*a*, to earth. In the resting condition, however, this winding is short circuited through a rectifier 44 and the back contact of relay 41 to earth. When relay 41 operates however this short circuit is removed and relay 42 will be operated or not according to whether relay 34 is operated or not. Assuming that relay 34 was not operated, relay 42 will operate when relay 41 operates and will disconnect the power supply from terminal 35 from the output line 24*a* indicating a "mark" or "1" in the binary number output. At the same time relay 42 prepares a holding circuit for itself from terminal 35 through contact of relay 42, winding 42*b*, resistor 46, rectifier 47 and the back contact of relay 41. Thus when relay 41 drops off as brush contact 28 leaves segment 40, relay 42 is held in the above circuit. All the storage relays will thus hold the appropriate mark or space indications of their respective output lines.

The final stage in the operation of the circuit is when brush contact 28 reaches the last segment 48 of the commutator. This operates relay 32 above referred to and breaks the holding circuit for relays 30, 31 and 34 so that these relays are cleared ready for the next rotation of the commutator. During the next rotation of the commutator a new combination of subtractor hold relays 34 is set up if the input voltage at terminal 29 has changed. The output on the output lines 24 is, however, unaffected until brush contact 28 again reaches segment 40 of the commutator whereupon relay 41 is again operated and relay 42 and its counterparts are reset to store the new combination of operated subtractor hold relays. It will thus be seen that the binary code combination set-up during one revolution of the commutator is stored during the next revolution and is available for operation of the addition circuit 11 during this time. The commutator 19 is rotated continuously so that the information available on the output lines 24 is renewed at each rotation and kept substantially up to date being one rotation of the commutator behind all the time.

Figure 5:
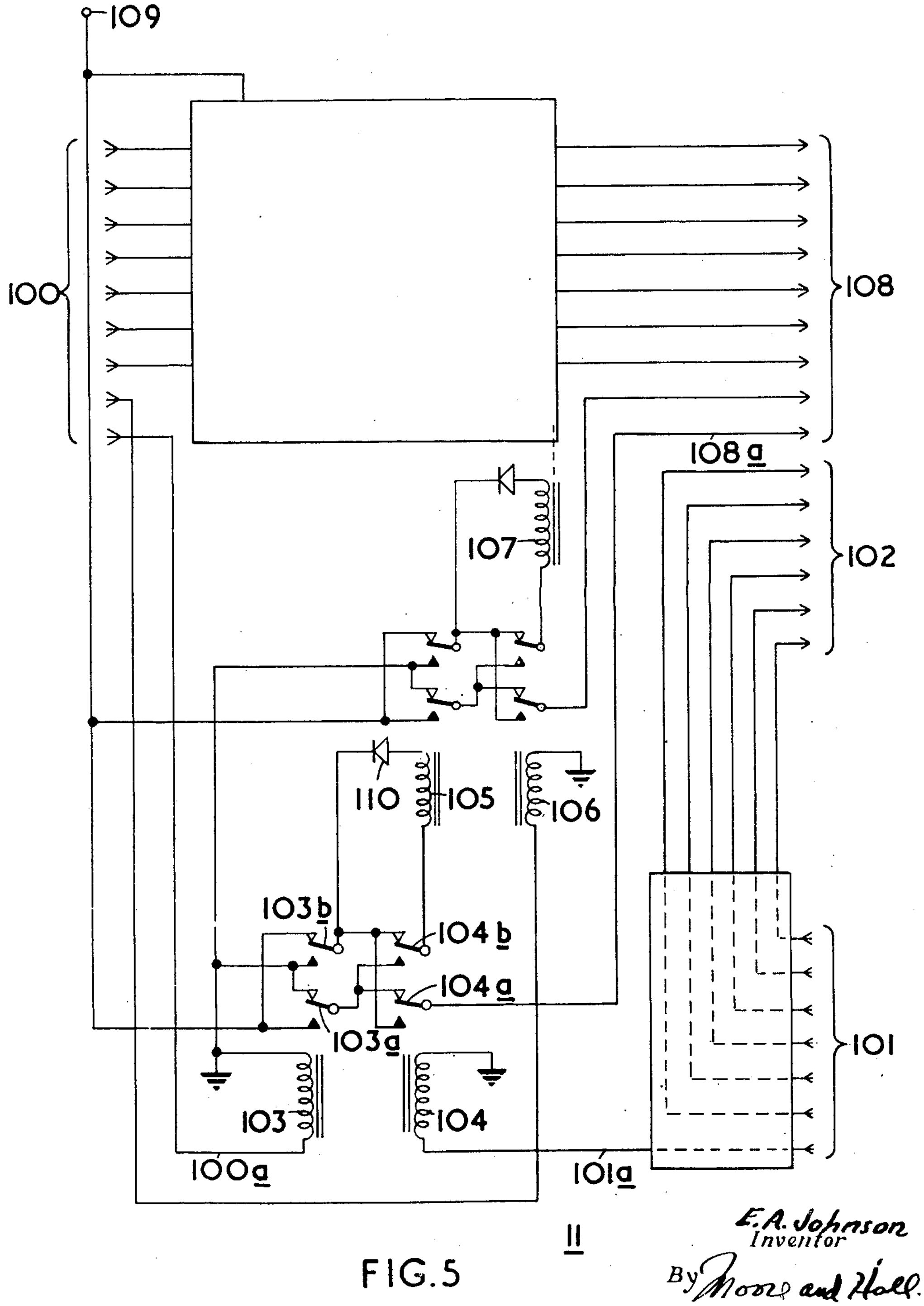
Fig. 5 illustrates a form of adding circuit which may be used to combine two sets of multiple-unit code signals in an arrangement such as that of Fig. 1.

The outputs on output lines 24 are combined with the outputs from the device 6 in the addition circuit 11 details of which are given in Fig. 5. In this figure the 9-digit outputs from device 6 are introduced through input leads 100, the seven output leads from the converter 10 being connected to the input leads 101. The information on the 6 leads 101 of least significance are passed out without change through output leads 102. The digit of greatest significance, however, is required to be added to the digit of least significance appearing in the 9-digit number. For this purpose the least significant digit of the 9-digit number is used to control a relay 103 and the digit of greatest significance in the 7-digit number is used to control a relay 104. These two relays 103 and 104 are connected as double contact change-over relays. If, when the two digits are added it is necessary to carry a digit into the place of the next higher significance the carry digit must be added to the input of next higher significance in the 9-digit number and so on. The existence or otherwise of a carry-over digit is recorded by a further relay 105 and the digit of next higher significance in the 9-digit number is applied to a relay 106. These two relays are connected as double contact change-over relays in a circuit exactly similar to that of relays 103 and 104 and control a further carry relay 107 which in turn coacts with a relay (not shown) connected to the input line of the 9-digit number of next higher significance, the arrangement being repeated in this manner throughout the 9-digit number lines so that if the number on the 9-digit number lines consists of "1's" throughout the carry digit will be passed right through the system and the digits changed over to "0's." The outputs of the 9 output lines 108 will therefore represent the sum of the original 9 digits and the digit of greatest significance of the 7-digit number. The operation of the adding circuits will be understood from a description of one only of these circuits and the operation of the circuit comprising relays 103 and 104 will now be described.

With zero indications on input lines 100*a* and 101*a* both relays 103 and 104 will be inoperative, that is to say, their contacts will be in the positions drawn. In this condition, earth is connected through back contact 103*a* and back contact 104*a* to output line 108*a* indicating a zero on this line. Relay 105 is inoperative being short-circuited by back contact 104*b* so that no carry digit is passed forward. If a "1" appears on line 101*a* power is applied from input terminal 109 through back contact 103*b* and operated contact 104*a* to the output line 108*a* so that a "1" is indicated on this output line. Operation of relay 105 in the circuit power supply from terminal 109, back contact 103*b*, rectifier 110, relay winding 105, operated contact 104*b*, back contact 103*a* to earth is prevented by the rectifier 110. If a "1" appears on line 100*a* power is applied to the output line 100*a* through the circuit from terminal 109 through operated contact 103*a* and back contact 104*a*, relay 105 being still short-circuited by back contact 104*b*. If, however, a "1" appears on both lines 100*a* and 101*a* earth is applied to output line 108*a* through the circuit from earth through operated contact 103*b* and operated contact 104*a* indicating a "0" as the sum. At the same time relay 105 is energised in the circuit from power input terminal 109 through operated contact 103*a*, operated contact 104*b*, relay winding 105, rectifier 110, and operated contact 103*b* to earth. Rectifier 110 is in the correct sense for relay 105 to operate in this circuit. Operation of relay 105 passes on a carry digit to the next circuit consisting of relays 105 and 106.

Figure 1:
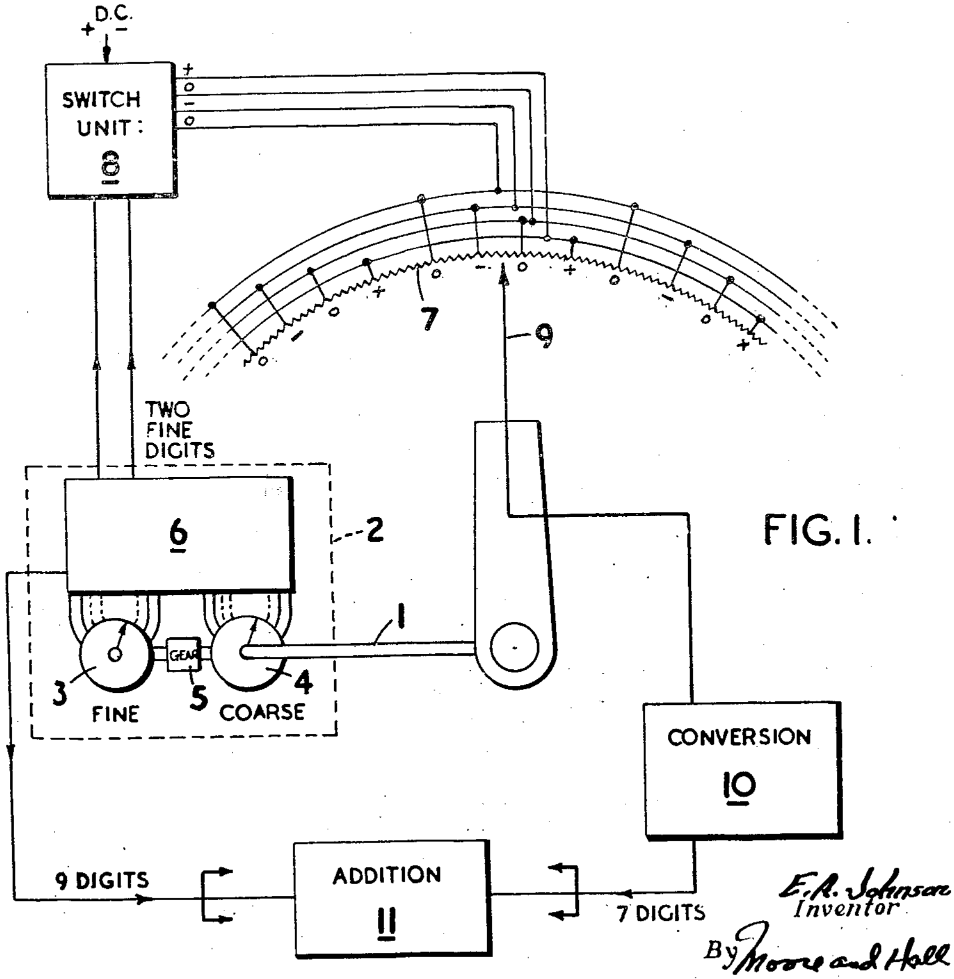
Fig. 1 illustrates diagrammatically an apparatus for developing a fifteen digit binary number which is capable of representing an input shaft position to approximately 1 minute of arc.
Figure 6:
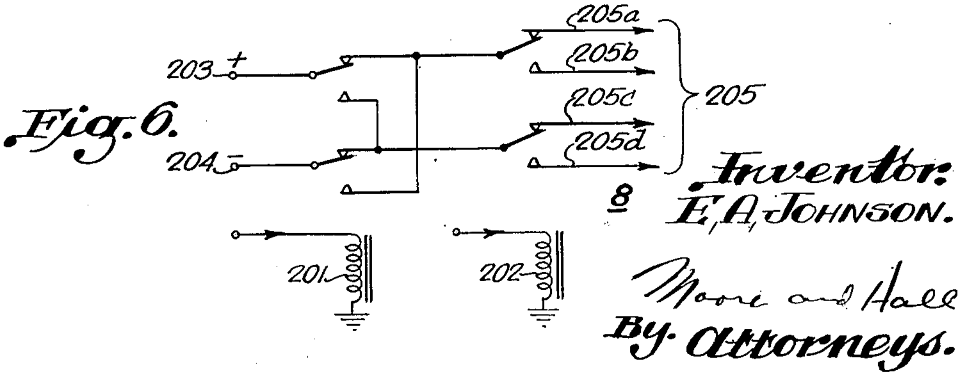
Fig. 6 illustrates a switch unit.

The switch unit 8 of Fig. 1 may take the form illustrated in Fig. 6, the arrangement here shown comprises two relays 201 and 202 to which the two fine digit outputs from device 6 are respectively applied. The positive and negative terminals of the D. C. supply are connected to terminals 203 and 204 and the four feed lines connected to potentiometer 7 are shown at 205. It will be seen by inspection of the circuit that as the digit signals applied to the relays 201 and 202 change progressively the pattern of voltages applied to the output lines 205 will change cyclically according to the following table:

| Digit | | Voltage | | | |
|---|---|---|---|---|---|
| Relay 201 | Relay 202 | 205*a* | 205*b* | 205*c* | 205*d* |
| 0 | 0 | + | 0 | − | 0 |
| 0 | 1 | 0 | + | 0 | − |
| 1 | 0 | − | 0 | + | 0 |
| 1 | 1 | 0 | − | 0 | + |

At the receiving end of the data transmission system according to the invention, the received 15 digit binary number may be employed in the manner described in specification Serial No. 89,535 to cause a system of coarse and fine commutators (preferably coarse, medium and fine potentiometers) to be driven by an automatic-following servo mechanism to set an output shaft to the appropriate angular position. Preferably, however, the receiving-end apparatus makes use of the same principles as are employed in the transmitting apparatus according to the invention and described above.

Figure 3:
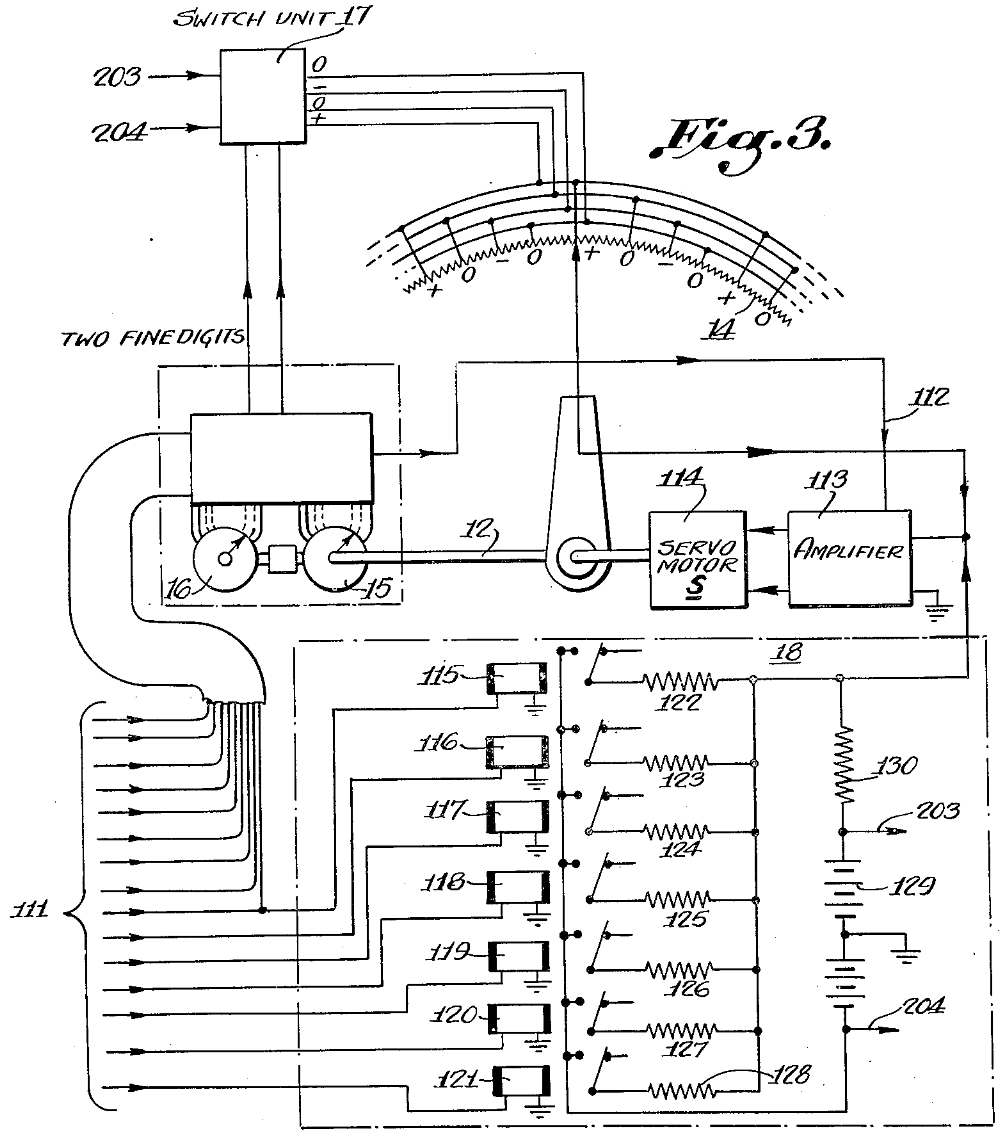
Fig. 3 illustrates an apparatus similar to that of Fig. 1 but adapted for use as a receiver for positional data.

One arrangement for this purpose is illustrated in Fig. 3. In this arrangement there is shown mounted on output shaft 12 the contact brush 13 of a potentiometer 14 similar to the transmitting-end potentiometer already described, and coupled to the output shaft are coarse and fine units 15 and 16 of the type described in specification Serial No. 89,535. These two units receive through nine of the input lines 111, digits of the received 15-digit binary number and supply through lead 112 an input voltage for amplifier 113, the output from which controls a servomotor 114 which drives the shaft 12 in such a sense as to reduce the voltage supplied by units 15 and 16 so that these units are driven to the null point corresponding to the binary number represented by the 9 largest digits. The shaft 12 is thereby set to its appropriate position to within the limits of accuracy represented by the 9-digits of the binary number. The two finest digits of these 9 digits operate, as above described with reference to Figs. 1 and 6 to step the voltage pattern on potentiometer 14 around so that the brush 13 now finds itself between positive-clockwise and negative-anticlockwise peaks of the voltage pattern. The voltage thus picked off by brush 13 is applied to the amplifier 113 as an input to control the servomotor 114.

The 7 smallest, or least significant digits of the 15-digit number are applied to an apparatus 18 which sets up a bias voltage the magnitude of which represents the 7-digit binary number on a scale related to the voltage range of potentiometer 14. This bias voltage is applied to the input of amplifier 113 in opposition to the voltage picked off by brush 13 so that unless these two voltages are equal the amplifier 113 experiences a resultant input voltage which causes it to drive the servomotor 114 and hence shaft 12 in the appropriate sense to reduce or increase the voltage picked off by brush 13 until it is equal and opposite to the voltage from apparatus 18 whereupon the input to amplifier 114 is reduced to zero and the shaft is then set to its correct position to the final accuracy represented by the whole of the 15-digit binary number.

The apparatus 18 is of the form shown in Fig. 1 of specification No. 89,535 and it will be seen to comprise seven relays 115 to 121, connected to seven of the input lines 111, the contacts of these relays controlling the connection of resistors 122–128 into circuit to provide a bias voltage from battery 129 to the input of amplifier 113. The battery 129, having a grounded centre-tap, supplies the operating voltage which is applied through switch unit 17 to potentiometer 14, and also supplies through resistor 130 a standing bias to amplifier 113 to cause the potentiometer brush 13; in the absence of any bias through resistors 122–128 to seek a position towards one of the energised taps of the potentiometer. As each resistor 122–128 is brought into circuit by its corresponding relay the resultant bias on the amplifier is reduced so that the corresponding null point on the potentiometer sought by brush 13 is moved progressively towards the next energised tap (of the reverse polarity).

The resistors 122–128 are graded in value in accordance with the significance of the digits, in the 7-digit binary number, which control the respective relays. The position along the potentiometer to which the null point is moved is, therefore, determined in accordance with the 7 digits of the binary number received so that the shaft 12 is turned to the correct position corresponding to the coded information received over the input lines 111. It will be seen that the ninth input line is connected both to the apparatus 15, 16 and to apparatus 18, thus providing an overlap of one digit which is necessary to ensure that the coarse and fine parts of the apparatus are properly correlated to treat the incoming 15 digit signals as a coherent 15-digit binary number.

I claim:

1. System for the transmission of data comprising at a transmitting point in combination an input shaft, means coupled to said input shaft for producing signals in the form of a multiple-unit code representative of the angular position of said input shaft in coarse fractional divisions of a shaft revolution, and a potentiometer having a contact brush coupled to said input shaft and operating on a resistance element, a plurality of tappings on said resistance element, means for energizing said tappings in a repetitive pattern of potential distribution positioned thereon in dependence upon said signals and means for presenting the voltage tapped off at said contact brush as a signal representative of the angular position of said shaft in fractional subdivisions of said coarse fractional divisions of a shaft revolution.

2. System for the transmission of data comprising at a transmitting point in combination an input shaft, means coupled to said input shaft for producing signals in the form of a multiple-unit code representative of the angular position of said input shaft in coarse fractional divisions of a shaft revolution, and a potentiometer having a contact brush coupled to said input shaft and operating on a resistance element, a plurality of tappings on said resistance element, means for energising said tappings in a repetitive pattern of potential distribution positioned thereon in dependence upon said signals and means for deriving from the voltage tapped off at said contact brush further signals in the form of a multiple-unit code.

3. System for the transmission of data comprising at a transmitting point in combination an input shaft, means coupled to said input shaft for producing signals in the form of a multiple-unit code representative of the angular position of said input shaft in coarse fractional divisions of a shaft revolution, and a potentiometer having a contact brush coupled to said input shaft and operating on a resistance element, a plurality of tappings on said resistance element, means for energising said tappings in a repetitive pattern of potential distribution positioned thereon in dependence upon said signals, means for deriving from the voltage tapped off at said contact brush further signals in the form of a multiple-unit code and means for combining the signals representative of the angular position of said input shaft with the signals derived from the voltage tapped off at said contact brush into a coherent multi-unit code representation of the angular position of said shaft in coarse fractional divisions of a shaft revolution and fractional subdivisions of said coarse fractional divisions.

4. System for the transmission of data comprising at a transmitting point in combination an input shaft, means coupled to said input shaft for producing signals in the form of a multiple-unit code representative of the angular position of said input shaft in coarse fractional divisions of a shaft revolution, and a potentiometer having a contact brush coupled to said input shaft and operating on a resistance element, a plurality of tappings on said resistance element, said tappings being divided into a plurality of groups each of an equal number of tappings, connections between corresponding tappings of all said groups, means for energising each of said connections with a voltage characteristic of a different part of a voltage pattern in dependence upon a group of code units selected from said signals and means for presenting the voltage tapped off at said contact brush as a signal representative of the angular position of said shaft in fractional subdivisions of said coarse fractional divisions of a shaft revolution.

5. System for the transmission of data comprising at a transmitting point in combination an input shaft, means coupled to said input shaft for producing signals in the form of a multiple-unit code representative of the angular position of said input shaft in coarse fractional divisions of a shaft revolution, and a potentiometer having a contact brush coupled to said input shaft and operating on a resistance element, a plurality of tappings on said resistance element, said tappings being divided into a plurality of groups each of an equal number of tappings, connections between corresponding tappings of all said groups, means for energising each of said connections with a voltage characteristic of a different part of a voltage pattern in dependence upon a group of code units selected from said signals and means for deriving from the voltage tapped off at said contact brush further signals in the form of a multiple-unit code.

6. System for the transmission of data comprising at a transmitting point in combination an input shaft, means coupled to said input shaft for producing signals in the form of a multiple-unit code representative of the angular position of said input shaft in coarse fractional divisions of a shaft revolution, and a potentiometer having a contact brush coupled to said input shaft and operating on a resistance element, a plurality of tappings on said resistance element, said tappings being divided into a plurality of groups each of an equal number of tappings, connections between corresponding tappings of all said groups, means for energising each of said connections with a voltage characteristic of a different part of a voltage pattern in dependence upon a group of code units selected from said signals, means for deriving from the voltage tapped off at said contact brush further signals in the form of a multiple-unit code and means for combining the signals representative of the angular position of said input shaft with the signals derived from the voltage tapped off at said contact brush into a coherent multi-unit code representation of the angular position of said shaft in coarse fractional divisions of a shaft revolution and fractional sub-divisions of said coarse fractional divisions.

7. System for the transmission of data comprising at a transmitting point in combination an input shaft, means coupled to said input shaft for producing signals in the form of a multiple-unit code representative of the angular position of said input shaft in coarse fractional divisions of a shaft revolution, and a potentiometer having a contact brush coupled to said input shaft and operating on a resistance element, a plurality of tappings on said resistance element, said tappings being divided into a plurality of groups each of an equal number of tappings, connections including adjustable padding resistors between corresponding tappings of all said groups, means for energising each of said connections with a voltage characteristic of a different part of a voltage pattern in dependence upon a group of code units selected from said signals and means for presenting the voltage tapped off at said contact brush as a signal representative of the angular position of said shaft in fractional sub-divisions of said coarse fractional divisions of a shaft revolution.

8. System as claimed in claim 7 wherein said tappings are connected in groups of four and adjustable padding resistors are connected between each tapping and the corresponding common connection and between each tapping and the next-but-one tapping.

9. System for the communication of data comprising at a receiving point an output shaft, a potentiometer having a contact brush moved by said output shaft and a resistance element a plurality of tappings on said resistance element, means for energising said tappings in a repetitive pattern of potential distribution positioned thereon in accordance with certain units of received multiple-unit code signals, means for deriving from certain other units of said multiple-unit code signals a voltage characteristic of said other units, means for comparing the voltage so derived with the voltage tapped off at said brush contact and means controlled by the disparity between the voltages so compared for driving said output shaft to reduce said disparity.

10. System for the communication of data comprising at a receiving point an output shaft, a potentiometer having a resistance element and a contact brush coupled to said output shaft and operating on said resistance element, a plurality of tappings on said resistance element, means for energising said tappings in a repetitive pattern of potential distribution positioned thereon in accordance with certain units of received multiple-unit code signals, means for deriving from certain other units of said multiple-unit code signals a voltage characteristic of said other units, means for comparing the voltage so derived with the voltage tapped off at said brush contact to produce an error voltage equal to the disparity between the compared voltages, and means controlled by said error voltage for driving said output shaft to reduce said error voltage.

11. In a system for the transmission of data and interpretation of said data at a remote position, a transmitting apparatus comprising an input shaft, means coupled to said input shaft for producing signals in the form of a multiple unit code representative of the angular position of said input shaft in coarse fractional divisions of a shaft revolution, a potentiometer having a resistance element and a contact brush coupled to said input shaft and operating on said resistance element, a plurality of tappings on said resistance element, said tappings being divided into a plurality of groups each of an equal number of tappings, means connecting respectively the corresponding tappings of all said groups, means for energising each of said connections with a voltage characteristic of a different part of a voltage pattern in dependence upon a group of code units selected from said signals, means for presenting the voltage tapped off at said contact brush as a signal representative of the angular position of said shaft in fine fractional subdivisions of said coarse fractional divisions of a shaft revolution, receiving apparatus for the interpretation of said coarse and fine multi-unit codes having an output shaft, means for producing a potential representative of the position of said output shaft, means for deriving from said incoming multi-unit code a potential representative of said code, means for comparing said derivative voltage with said output shaft-position voltage to produce an error voltage, and means controlled by said error voltage for driving said output shaft to reduce said error voltage.

12. A system as claimed in claim 11 wherein said input shaft and said output shaft are integral portions of a servomechanism.

13. In a servomechanism; apparatus for the transmission of data to a remote point comprising transmitting apparatus having an input shaft, first means coupled to said input shaft for obtaining a multiple-unit binary code representative of the angular position of said input shaft in coarse fractional divisions of a shaft revolution, second means coupled to said input shaft for obtaining a further multiple-unit binary code representative of the angular position of said input shaft in fine fractional subdivisions of said coarse fractional division, means interconnecting said first means and said second means including means whereby said coarse position code is modified in response to certain units of said fine position code, and said fine position code is in turn modified in accordance with predetermined changes in said coarse position code; and receiving apparatus for the reinterpretation of said coarse position and said fine position codes having an output shaft, driving means including means responsive to said received coarse position code for positioning said output shaft in accordance with said coarse position code, means for obtaining a potential representative of said output shaft position in fine subdivisions of a coarse fractional division of a shaft revolution, means for converting said received fine position code to a potential representative of said input shaft position in fine subdivisions of a coarse fractional division of its shaft revolution, and comparison means for comparing the potentials representative of the fine positionings of said input and said output shafts to produce an error voltage equal to the disparity between said fine position potentials, said driving means including means responsive to said error voltage for further positioning said output shaft to reduce said error voltage.

14. In a servomechanism; apparatus for the transmission of data to a remote point comprising transmitting apparatus having an input shaft, first means coupled to said input shaft for obtaining a multiple-unit binary code representative of the angular position of said input shaft in coarse fractional divisions of a shaft revolution, second means coupled to said input shaft for obtaining a further multiple-unit binary code representative of the angular position of said input shaft in fine fractional subdivisions of said coarse fractional division, said second means including means responsive to changes in the code output of said first means whereby said fine position code is modified in accordance with predetermined changes in certain units of said coarse position code to define the position of said input shaft; and receiving apparatus for the reinterpretation of said coarse position and said fine position codes having an output shaft, driving means including means responsive to said received coarse position code for positioning said output shaft in accordance with said coarse position code, means for obtaining a potential representative of said output shaft position in fine subdivisions of a coarse fractional division of a shaft revolution, means for converting said received fine position code to a potential representative of said input shaft position in fine subdivisions of a coarse fractional division of its shaft revolution, and comparison means for comparing the potentials representative of the fine positionings of said input and said output shafts to produce an error voltage equal to the disparity between said fine position potentials, said driving means including means responsive to said error voltage for further positioning said output shaft within the coarse fractional division of its shaft revolution to reduce said error voltage.

15. In a servomechanism; apparatus for the transmission of data to a remote point comprising transmitting apparatus having an input shaft, first means coupled to said input shaft for obtaining a multiple-unit binary code representative of the angular position of said input shaft in coarse fractional divisions of a shaft revolution, second means coupled to said input shaft for obtaining a further multiple-unit binary code representative of the angular position of said input shaft in fine fractional subdivisions of said coarse fractional divisions, means connecting said second means to said first means whereby said coarse position code is modified in response to certain units of said fine position code; and receiving apparatus for the reinterpretation of said coarse position and said fine position codes having an output shaft, driving means including means responsive to said received coarse position code for positioning said output shaft in accordance with said coarse position code, means for obtaining a potential representative of said output shaft position in fine subdivisions of a coarse fractional division of a shaft revolution, means for converting said received fine position code to a potential representative of said input shaft position in fine subdivisions of a coarse fractional division of its shaft revolution, and comparison means for comparing the potentials representative of the fine positionings of said input and said output shafts to produce an error voltage equal to the disparity between said fine position potentials, said driving means including means responsive to said error voltage for further positioning said output shaft to reduce said error voltage.

16. In a servomechanism; apparatus for the transmission of data to a remote point comprising transmitting apparatus having an input shaft, first means coupled to said input shaft for obtaining a multiple-unit binary code representative of the angular position of said input shaft in coarse fractional divisions of a shaft revolution, second means coupled to said input shaft for obtaining a further multiple-unit binary code representative of the angular position of said input shaft in fine fractional subdivisions of said coarse fractional divisions, means interconnecting the first means and the second means including means for modifying one of the codes according to predetermined changes in the other one in such manner that the two codes taken together define the position of the input shaft; and receiving apparatus for the reinterpretation of said coarse position and said fine position codes having an output shaft, driving means including means responsive to said received coarse position code for positioning said output shaft in accordance with said coarse position code, means for obtaining a potential representative of said output shaft position in fine subdivisions of a coarse fractional division of a shaft revolution, means for converting said received fine position code to a potential representative of said input shaft position in fine subdivisions of a coarse fractional division of its shaft revolution, and comparison means for comparing the potentials representative of the fine positionings of said input and said output shafts to produce an error voltage equal to the disparity between said fine position potentials, said driving means including means responsive to said error voltage for further positioning said output shaft to reduce said error voltage.

17. A servomechanism as claimed in claim 13 including means connecting the output of said transmitting apparatus to the input of said receiving apparatus.

18. Transmitting system as claimed in claim 5 having in addition receiving apparatus for reinterpreting said coarse position and said potentiometer voltage multi-unit codes comprising an output shaft, positioning means driving said output shaft within a coarse fractional subdivision of a shaft revolution in accordance with said incoming coarse position multi-unit code, means for deriving a potential representative of said output shaft position in fine fractional subdivisions of said coarse fractional subdivision, means for translating said incoming potentiometer-voltage multi-unit code into a potential representative of said input shaft position in fine fractional subdivisions of its coarse fractional positioning, means for comparing the potentials representative of said fine positionings of said input and output shafts to produce an error voltage, and further means in said positioning means responsive to said error voltage to further drive said output shaft to reduce said error voltage.

19. System for the transmission of data comprising at a transmitting point an input shaft, first means coupled to said input shaft for producing signals in the form of a multiple unit code representative of the angular position of the input shaft in coarse fractional divisions of a shaft revolution, second means coupled directly to said first means for producing a further multiple unit code representative of said input shaft position in fine subdivisions of said coarse fractional subdivision, said second means comprising a linear potentiometer having a resistance element and a contact brush operating on said resistance element, a plurality of tappings on said resistance element, means energising said tappings in a repetitive pattern of potential distribution in dependence upon the coarse divisions recorded by said first means, means progressing said pattern around said resistance element in step with the coarse fractional changes in angular position of said input shaft, means for converting a potential into a multiple unit code representative of said potential, and means connecting said contact brush to said converting means to effect such conversion of the potential picked off said resistance element by said contact brush.

20. Transmitting system as claimed in claim 19 having in addition means for combining the signal representative of the coarse angular position of said input shaft and the signal output of said converting means into a coherent multi-unit code representation of the angular position of said input shaft in coarse fractional divisions of a shaft revolution and fractional subdivisions of said coarse fractional divisions.

21. System for transmitting data to a remote position comprising at a transmitting point an input shaft, first means coupled to said input shaft for producing signals in the form of a multiple unit binary code representative of the angular position of said input shaft in coarse fractional divisions of a shaft revolution, potentiometer means coupled to said input shaft, said potentiometer means having a resistance element, a contact brush operating on said resistance element, and a plurality of tapping points on said resistance element, switching means controlled by certain units of said multiple unit code output of said first means and connected to said tapping points for energizing said resistance element in a predetermined potential pattern and for progressing said pattern around said resistance element in response to changes in the output of said first means, conversion means for deriving a multiple unit code output representative of a potential input, and means connecting said contact brush to said conversion means to effect a translation of the potential picked off of said resistance element by said contact brush into a multi-unit code representative of the angular position of said input shaft in fractional subdivisions of said coarse fractional division.

22. System for transmitting data to a remote position comprising transmitting means as claimed in claim 21 and having in addition receiving means, means connecting the output of said transmitting means to the input of said receiving means, said receiving means comprising an output shaft, driving means for positioning said output shaft, means connecting certain units of said incoming multiple unit code representative of the coarse angular position of said input shaft to said driving means to position said output shaft in accordance with these code units, second conversion means for deriving a potential output representative of a multi-unit code input, means connecting certain other units of said incoming multiple unit code representative of said fractional subdivision position of said input shaft to said second conversion means, means for deriving a potential representative of the angular position of said output shaft in fractional subdivisions of a coarse fractional division of a shaft revolution, means comparing the output of said second conversion means with said output shaft fractional subdivision potential to produce an error voltage, and means connecting said error voltage to said driving means, said driving means including means responsive to said error voltage for further controlling said driving means to position said output shaft so as to reduce said error voltage.

ERIC A. JOHNSON.

REFERENCES CITED

The following references are of record in the file of this patent:

UNITED STATES PATENTS

| Number | Name | Date |
|---|---|---|
| 502,399 | Haskins | Aug. 1, 1893 |
| 2,023,221 | Fischer | Dec. 3, 1935 |
| 2,207,743 | Larson | July 16, 1940 |
| 2,374,439 | Korevec | Apr. 24, 1945 |
| 2,397,604 | Hartley | Apr. 2, 1946 |
| 2,448,783 | De Giers | Sept. 7, 1948 |